United States Patent [19]

Rochina et al.

[11] 4,297,478
[45] Oct. 27, 1981

[54] PROCESS FOR THE DISCONTINUOUS PRODUCTION OF AROMATIC IN MIXTURE OF POLYAMIDES CALCIUM CHLORIDE AND N-METHYLPYRROLIDONE-2

[75] Inventors: Vincent Rochina, L'Arbresle; Jean Sacco, Lyons, both of France

[73] Assignee: Rhone-Poulenc-Textile, Paris, France

[21] Appl. No.: 897,499

[22] Filed: Apr. 18, 1978

[30] Foreign Application Priority Data

Apr. 27, 1977 [FR] France .............................. 77 13620

[51] Int. Cl.$^3$ ............................................. C08G 69/28
[52] U.S. Cl. ................................... 528/336; 528/312; 528/319; 528/331; 528/338; 528/339; 528/335; 528/347; 528/348
[58] Field of Search .............. 260/78 R; 528/336, 348

[56] References Cited

U.S. PATENT DOCUMENTS

| 3,671,542 | 6/1972 | Kwolek | 260/30.8 R |
|---|---|---|---|
| 3,966,686 | 6/1976 | Asakura et al. | 260/78 R |
| 4,075,172 | 2/1978 | Ozawa | 528/348 |
| 4,172,938 | 10/1979 | Mera et al. | 528/336 |

FOREIGN PATENT DOCUMENTS

| 157327 | 8/1976 | Netherlands . |
|---|---|---|
| 1547802 | 6/1979 | United Kingdom . |

OTHER PUBLICATIONS

Fiber Forming Aromatic Polyamides–Man–Made Fibers, vol. 2 (Black et al.), p. 301, 1968.
Polymer Science (USSR) Federov et al., 12, 1970, pp. 2475-2491.
Polymery (Chodkowski et al.), 1971, pp. 514-515.

*Primary Examiner*—Harold D. Anderson
*Attorney, Agent, or Firm*—Stevens, Davis, Miller & Mosher

[57] ABSTRACT

A process is disclosed for the discontinuous production of a polyamide having the generic formula:

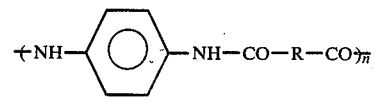

and an inherent viscosity of at least 3, wherein 50 to 100% of the radicals R are p-phenylene radicals and 0 to 50% are n-butylene radicals. Terephthaloyl chloride, and optionally adipoyl chloride, are reacted in stoichiometric amounts with a solution of paraphenylenediamine and/or of 4,4'-diaminoadipanilide in a mixture of N-methylpyrrolidone-2 and calcium chloride which is homogeneous and substantially anhydrous, with a molar ratio of CaCl$_2$/ unit:

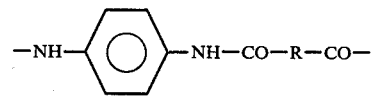

of at least 0.7, and under conditions such that the final composition contains 5 to 16% by weight of polymer, relative to the N-methylpyrrolidone-2. The polymer obtained can be converted into films, fibers and high-performance yarns for reinforcing composite materials or articles made of rubber.

6 Claims, 1 Drawing Figure

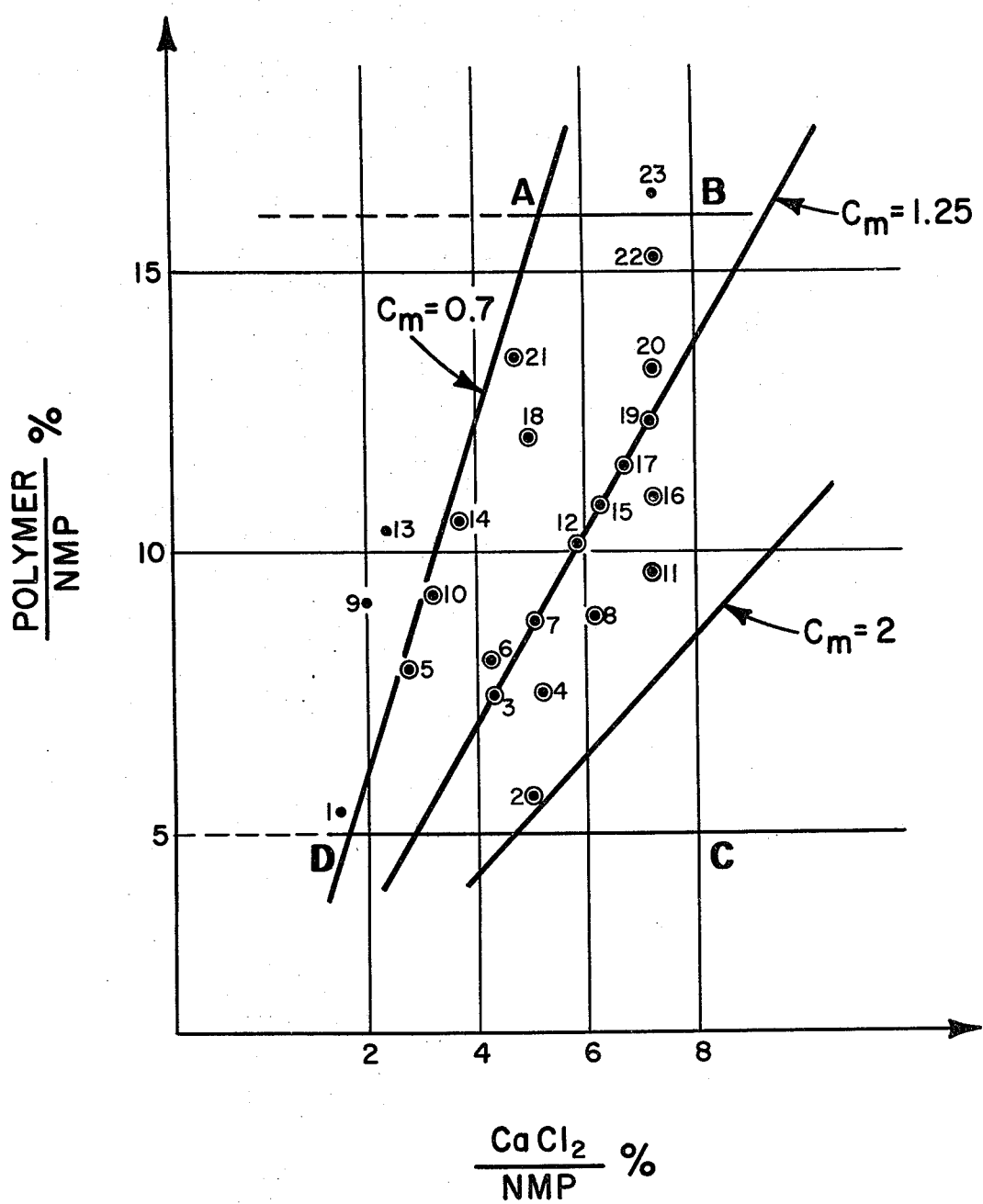

PROCESS FOR THE DISCONTINUOUS PRODUCTION OF AROMATIC IN MIXTURE OF POLYAMIDES CALCIUM CHLORIDE AND N-METHYLPYRROLIDONE-2

The invention relates to a new process for the discontinuous production of poly-(para-phenylene terephthalamide) and its copolymers, having a high inherent viscosity.

French Pat. No. 2,010,753 discloses anisotropic compositions of aromatic polyamides of the poly-(para-phenylene terephthalamide) type, having an inherent viscosity which is generally greater than 1, and of liquids which, besides sulphuric acid and hydrofluoric acid, may be various amides and ureas, especially dimethylacetamide (DMAC), N-methylpyrrolidone-2 (NMP), hexamethylphosphotriamide (HMPT) and tetramethylurea (TMU). Salts such as lithium chloride or calcium chloride can be added to the amides and ureas. In this patent, the preparation of poly-(para-phenylene terephthalamide) (PPD-T) in a mixture of HMPT and NMP in the ratio of ½ by weight is recommended. However, it is now known that HMPT constitutes a dangerous product by virtue of its carcinogenic properties, with the result that its use requires very great precautions, which enormously complicates the process. This patent does indeed mention the possibility of preparing other aromatic polymers in situ in the solvent of the compositions to be spun. This is the case, for example, with poly-(para-benzamide), of which the preparation in TMU is terminated in the presence of LiCl which is produced by the neutralization with lithium carbonate of the HCl formed. However, this process leads to low viscosity polymers. It is also the case with the preparation of poly-(chloro-p-phenylene terephthalamide) in a mixture of DMAC and 1% of LiCl, but this polymer is much more soluble than PPD-T.

Moreover, for the production of high viscosity PPD-T, more recent patents only recommend the use of organic solvents such as a mixture of HMPT and NMP, according to French Patent Application No. 2,134,582 published in 1972, and even pure HMPT, according to U.S. Pat. No. 3,850,888.

A. A. FERODOV, V. M. SAVINOV and L. B. SOKOLOV, Pol. Science USSR, 12, No. 10 (1970), describe the production of PPD-T in mixtures of various solvents, namely, NMP, DMAC, HMPT and TMU, with lithium bromide or chloride. However, the inherent viscosity of the polymers obtained is always low and does not exceed 2.6 after ageing for 3 hours.

E. CHODKOWSKI, J. MACKOWIAK, W. KOZLOWSKI and H. ORZECHOWSKA, Polimery, 1971, pages 514–515, have described the production of PPD-T in mixtures of DMAC with lithium chloride, lithium bromide, or calcium chloride. The viscosity of the polymers obtained is again rather low.

French Patent Application No. 2,301,548, published on Sept. 17, 1976, relates to the preparation of PPD-T having an inherent viscosity of at least 2.5 (measured at 25° C. on a solution containing 0.5% by weight of PPD-T in 100 ml of sulphuric acid of 96% strength by weight), by reacting p-phenylenediamine with terephthaloyl chloride in a mixture of NMP and calcium chloride, the latter being employed in a proportion of at least 5% relative to the NMP, but preferably in a greater proportion, and being beyond the limit of solubility so that it remains in suspension, and even in an amount by weight which is at least equal to the amount by weight of PPD-T formed, if it is desired to obtain high values of viscosity. Such a process, which recommends and exemplifies the use of a large amount of calcium chloride, appears expensive and difficult to carry out industrially. In particular, a process of this type, using such large amounts of calcium chloride which is well-known for its hygroscopicity, can lead to considerable difficulties in the dehydration, handling, recovery, regeneration, and treatment of the effluents.

The present invention relates to a process for the discontinuous production of a polyamide of the generic formula:

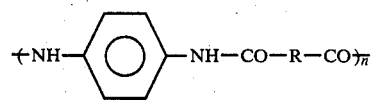

in which 50 to 100% of the radicals R are p-phenylene radicals and 0 to 50% are n-butylene radicals, which polyamide has an inherent viscosity of at least 3 (measured at 25° C. on a solution in 100% strength sulphuric acid which has a concentration of 0.5 g of polymer in 100 ml of solvent.

The process is characterized in that terephthaloyl chloride, and optionally adipoyl chloride, are reacted with a solution of para-phenylenediamine and/or of 4,4'-diaminoadipanilide in a mixture of N-methylpyrrolidone-2 and calcium chloride, under conditions such that:

the acid chloride or chlorides and the diamine or diamines are in essentially stoichiometric proportions;

the solution of diamine in the mixture of NMP and $CaCl_2$ is homogeneous and substantially anhydrous;

the calcium chloride content is such that the ratio $C_m$ of the number of mols of $CaCl_2$ to the number of units:

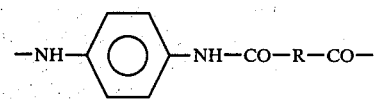

is at least 0.70; and the relative amounts of reactants and solvents are chosen such that, at the end of the reaction, the polymer content of the composition obtained is between 5 and 16% by weight, expressed relative to the N-methylpyrrolidone-2.

The attached FIGURE shows a graph which gives, on the abscissa, the ratio of calcium chloride/NMP, expressed in % by weight: $CaCl_2/NMP$ %; on the ordinate, the ratio of polymer/NMP, expressed in % by weight: polymer/NMP %; and in oblique lines, the curves corresponding to various molar ratios expressed by: $C_m$ = mols $CaCl_2$/unit:

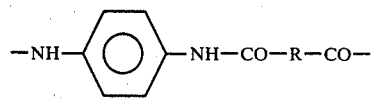

On this graph, the quadrilateral ABCD represents the points corresponding to the process according to this invention, which makes it possible to obtain a polymer having an inherent viscosity greater than 3.

The segments AB and CD correspond respectively to the polymer contents of 16 and 5% by weight, relative to the NMP. The segment AD is on the curve corresponding to a molar ratio $C_m$ of 0.70. Finally, the segment BC is situated on the line of the limit of solubility of the calcium chloride in the diamine solution. In the FIGURE, this line is drawn at 8% of $CaCl_2$/NMP, which is generally considered as a maximum which may be unsuitable under certain operating conditions, in particular when the temperature of the diamine solution is very low and/or when the medium is very anhydrous.

The calcium chloride content is preferably between 2 and 8% by weight, relative to the NMP.

The numbered points marked on this graph represent different experiments which have been carried out and are described in the correspondingly numbered examples below.

When it is desired to obtain the copolymer poly(paraphenylene terephthalamide/adipamide), it is possible either to react terephthaloyl and adipoyl chlorides, as a mixture or separately, with a solution of para-phenylenediamine, or to react terephthaloyl chloride with a solution of 4,4'-diaminoadipanilide by itself or mixed with para-phenylenediamine, or also to react the mixture of chlorides with a solution of a mixture of the diamines.

The chloride or chlorides may be added in one or more stages at intervals which may vary from a few seconds to a few days of intermediate storage of the mixture of diamine and prepolymer thus obtained.

For greater convenience, the term dichloride will be used in the following text to denote both terephthaloyl chloride by itself and its mixture with adipoyl chloride. Likewise, the term diamine will be used to denote both para-phenylenediamine and 4,4'-diaminoadipanilide or their mixture with one another or with the prepolymer which is optionally formed.

In order to carry out the process according to the present invention, it is very important that the stoichiometry of the dichloride and the diamine should be observed in order to obtain a high viscosity. It is therefore appropriate to study the reaction beforehand by simple experiments in order to satisfactorily adjust the ratio of dichloride to diamine as a function of their respective purity and the dryness of the solvent.

Since the reaction of the dichloride with the diamine is very rapid, i.e., of the order of a few seconds to a few minutes depending on the temperature, they must be mixed by very efficient stirring.

The solution of diamine in the mixture of NMP and $CaCl_2$ must be homogeneous, that is to say that, in particular, it must not at the time of its use (i.e., the time of reaction of the diamine present in the solution with the dichloride) contain any calcium chloride, either by itself or complexed, in suspension, which would increase the cost without any offsetting advantage. In order to do this, the concentration by weight of calcium chloride in the NMP must not exceed about 6 to 8%, the limit of solubility varying as a function of the water content and the temperature of the diamine solution, the nature and amount of the diamine, the dissolution process (in particular, time and temperature), and the form of the calcium chloride (powder, chips or crystals).

The solution of diamine in the mixture of NMP and $CaCl_2$ must be substantially anhydrous, that is to say that its water content must not exceed 1,500 ppm, but it is generally preferred not to exceed 1,000, and preferably 500 or even 200 ppm by weight of water.

The temperature of the diamine solution will generally be lower than or equal to 50° C., and preferably between 0° and 30° C., in order to obtain high viscosities, although it is also possible, in certain cases, to use temperatures a little higher than 30° C., but especially temperatures lower than 0° C., as long as the diamine solution does not crystallize.

The terephthaloyl chloride is preferably introduced as a powder in order not to overheat the reaction mixture, although it is also possible to use it in the molten state. Since it is liquid at ordinary temperature and down to −2° C., the adipoyl chloride is generally introduced into the reaction medium in this form.

The viscosity of the polymers obtained by the process according to the present invention increases as the reaction is carried out closer to the true stoichiometry, that is to say the stoichiometry which takes into account the purity of the reactants and the solvent and is determined beforehand by experiments using several molar ratios situated on either side of the ratio 1.

Furthermore, the temperature of the diamine solution must be decreased as the concentration of polymer in the final composition increases. In particular, it must be decreased as the concentration of calcium chloride is decreased. Thus, it is generally preferred to use a diamine solution at a temperature lower than 20° C. for a polymer concentration greater than 10%. Likewise, a temperature lower than 10° C. is preferably used when the calcium chloride content, relative to the NMP, is less than 4% by weight.

The process according to this invention makes it possible to obtain, with very high uniformity, a PPD-T, or its copolymers derived from adipic acid, having an inherent viscosity (measured, as stated above, in 100% strength $H_2SO_4$) which is at least 3, generally greater than 4, and which easily reaches 5 and even 6.

These good results of the process according to the present invention are, moreover, even more surprising because they are obtained with calcium chloride concentrations which do not exceed the limit of solubility of the latter in the solution of NMP and diamine, and which are frequently even very much less than 5% by weight relative to the NMP, whereas French Application No. 2,301,548 informs and exemplifies that the highest values of the inherent viscosity of the PPD-T are obtained when part of the calcium chloride is in the solid phase at the start of the reaction and, in particular, when the amount by weight of calcium chloride is at least equal to that of the polymer which corresponds to a molar ratio $C_m$=mols $CaCl_2$/unit:

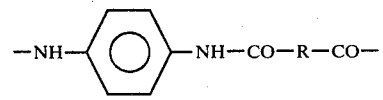

which is greater than 2.

Compared with a process using HMPT, the process according to the present invention has a very distinct industrial value simultaneously from the points of view of economy, hygiene and safety, because it does not exhibit any toxicological danger and, for this reason, does not require any special precautions which may be detrimental to both the technical nature and the economy of the process. In addition, since NMP is more stable than HMPT with respect to hydrolysis and thermolysis reactions, only very small amounts of it are lost during the recovery processes.

Compared with the process of French Application No. 2,301,548, the process according to the present invention is very valuable both from the technical point of view and from the economic point of view, by virtue of the small amounts of $CaCl_2$ employed, which greatly facilitates the operations of dehydrating, handling, recovering, regenerating and treating the effluents.

The polyamides obtained according to the present invention may be used for the manufacture of shaped articles, such as films, yarns and high-performance fibers; for example, by dissolving the precipitated polymer in a sulphuric acid solvent and spinning or forming a film or fiber by known means. The articles thus obtained may be used, for example, as a reinforcement in composite structures or in rubber articles such as tires, belts, bands, and the like.

The following examples are given in order still better to illustrate the invention but without in any way limiting it.

In these examples, the inherent viscosity is calculated using the following expression:

$$I.V. = \frac{\ln \eta \text{ relative}}{C}$$

in which C is the concentration in weight per volume, expressed in g per 100 ml; the relative viscosity being measured at 25° C. on a solution in 100% strength sulphuric acid which has a concentration of 0.5 g of polymer in 100 ml of solvent.

The water content of the solvents and the solutions is measured coulometrically.

EXAMPLES 1 TO 25

NMP containing 200 ppm of water, and calcium chloride which has been dried at 140° C. at atmospheric pressure and still contains 0.2% by weight of water, are introduced in various proportions into a 45 liter reactor. The mixture is heated to 90° C. It is cooled, para-phenylenediamine is added at about 60° C. and the cooling is continued down to the chosen temperature. Powdered terephthaloyl choride is then added, whilst stirring vigorously, in an exactly stoichiometric amount relative to the amount of p-phenylenediamine, taking account of the purity of the reactants and the solvent. The stirring is continued for 1 hour. The amounts of starting materials correspond to the production of 6 mols of polymer.

The operation conditions and the results obtained are recorded in the following table.

The following have been specified in this table: the polymer content, expressed in % by weight relative to the NMP; PPD-T/NMP %; the temperature of the solution of diamine in NMP+$CaCl_2$ at the time of introduction of the chloride: T°C.; the $CaCl_2$ content, expressed in % by weight relative to the NMP:$CaCl_2$/NMP %; the ratio:$C_m$; and the inherent viscosity: I.V.

| Example | $\frac{CaCl_2}{NMP}$ % | $C_m$ | $\frac{PPD-T}{NMP}$ % | T °C. | I.V. |
|---|---|---|---|---|---|
| 1 | 1.52 | 0.6 | 5.44 | 0 | 1.60 |
| 2 | 4.91 | 1.88 | 5.61 | 0 | 3.60 |
| 3 | 4.28 | 1.24 | 7.41 | 10 | 5.05 |
| 4 | 5.20 | 1.50 | 7.50 | 5 | 4.70 |
| 5 | 2.76 | 0.75 | 7.90 | 0 | 4.40 |
| 6 | 4.28 | 1.14 | 8.06 | 0 | 5.05 |
| 7 | 5.15 | 1.25 | 8.75 | 5 | 5.10 |
| 8 | 6.15 | 1.50 | 8.85 | 5 | 5.20 |
| 9 | 2.125 | 0.5 | 9.12 | 20 | 1.04 |
| 10 | 3.22 | 0.75 | 9.22 | 0 | 4.45 |
| 11 | 7.25 | 1.63 | 9.55 | 0 | 5.40 |
| 12 | 5.90 | 1.25 | 10.15 | 5 | 5.30 |
| 13 | 2.43 | 0.50 | 10.43 | 0 | 1.40 |
| 14 | 3.82 | 0.75 | 10.60 | 0 | 3.50 |
| 15 | 6.30 | 1.25 | 10.85 | 5 | 5.30 |
| 16 | 7.25 | 1.423 | 10.94 | 0 | 4.90 |
| 17 | 6.75 | 1.25 | 11.60 | 5 | 4.80 |
| 18 | 4.99 | 0.89 | 12.04 | 0 | 4.70 |
| 19 | 7.15 | 1.25 | 12.35 | 5 | 4.50 |
| 20 | 7.25 | 1.18 | 13.19 | 0 | 4.90 |
| 21 | 4.70 | 0.75 | 13.45 | −10 | 3.00 |
| 22 | 7.25 | 1.02 | 15.26 | 0 | 3.20 |
| 23 | 7.25 | 0.95 | 16.38 | 0 | 1.40 |
| 24 | 6.41 | 2.4 | 5.7 | 20 | 6.14 |
| 25 | 2.59 | 1.0 | 5.5 | 20 | 4.14 |

EXAMPLE 26

Into the same reactor as in the preceding examples, 4.8 mols of powdered terephthaloyl chloride are introduced in a solution of 3.6 mols of para-phenylenediamine and of 1.2 mols of 4,4'-diaminoadipanilide in a mixture of NMP and $CaCl_2$ at 5° C., the mixture being such that the $CaCl_2$ content is 6.76% by weight relative to the NMP, and such that the molar ratio of $CaCl_2$/mean copolymer unit is 1.50.

A composition containing 9.49% of a copolymer having an inherent viscosity of 3.94 is obtained.

EXAMPLES 27 AND 28

Into the same reactor as in the preceding examples, 1,052.85 g of powdered terephthaloyl chloride are introduced in a solution of 467.2 g of para-phenylenediamine and of 274.2 g of 4,4'-diaminoadipanilide in a mixture of NMP and $CaCl_2$ at 30° C., which contains 235 ppm of water.

The operating conditions and the results obtained are as follows:

| Example | 27 | 28 |
|---|---|---|
| Copolymer/NMP % | 5.7 | 5.5 |
| $CaCl_2$/NMP % | 6.42 | 2.59 |
| $C_m = \frac{CaCl_2}{\text{mean copolymer unit}}$ | 2.39 | 1.0 |
| Inherent viscosity | 6.10 | 5.37 |

EXAMPLE 29

Into a 2 liter reactor, 93.25 g of powdered terephthaloyl chloride are introduced in a solution of 41.34 g of para-phenylenediamine and of 24.23 g of 4,4'-diaminoadipanilide in a mixture of NMP and $CaCl_2$ at 0° C., which contains 235 ppm of water.

The operation conditions and the result obtained are as follows:

| | |
|---|---|
| Copolymer/NMP % | 15.7 |
| $CaCl_2$/NMP % | 5.54 |
| $C_m$ | 0.75 |

| Inherent viscosity | 4.11 |
| --- | --- |

EXAMPLE 30

A solution containing 648.25 g of para-phenylenediamine in a mixture of NMP and CaCl$_2$, which contains 150 ppm of water and is cooled to 0° C., is prepared in a 45 liter reactor. 526.42 g of terephthaloyl chloride are added first, followed, after 3 minutes, by 154.5 g of adipoyl chloride and, finally, after a further 3 minutes, by 526.42 g of terephthaloyl chloride.

The operating conditions and the result obtained are as follows:

| Copolymer/NMP % | 9.65 |
| --- | --- |
| CaCl$_2$/NMP % | 7.50 |
| C$_m$ | 1.7 |
| Inherent viscosity | 5.42 |

EXAMPLES 31 TO 37

The procedure of Example 30 is followed, but adding the adipoyl chloride first, and then adding the total amount of terephthaloyl chloride all at once, after 3 minutes in the case of Examples 31, 32, 33, 35, 36 and 37, and after 12 minutes in the case of Example 34.

The other operating conditions and the results obtained are as follows:

| Examples | $\frac{CaCl_2}{NMP}$ % | C$_m$ | $\frac{copolymer}{NMP}$ % | T °C. | Water ppm | I.V. |
| --- | --- | --- | --- | --- | --- | --- |
| 31 | 2.59 | 1.0 | 5.5 | 20 | 235 | 4.81 |
| 32 | 6.14 | 2.90 | 4.5 | 30 | 235 | 4.44 |
| 33 | 2.80 | 0.75 | 7.9 | 0 | 235 | 5.62 |
| 34 | 4.25 | 0.75 | 12 | 0 | 235 | 4.12 |
| 35 | 6.75 | 1.5 | 9.6 | 0 | 320 | 5.05 |
| 36 | 5.6 | 1.25 | 9.45 | 0 | 320 | 4.25 |
| 37 | 6.41 | 0.90 | 15.20 | 0 | 235 | 4.03 |

EXAMPLE 38

A solution containing 57.41 g of para-phenylenediamine in a mixture of NMP and CaCl$_2$, which contains 235 ppm of water and is cooled to 0° C., is prepared in a 2 liter reactor. 13.69 g of adipoyl chloride are added first, followed, after 1 hour, by 93.25 g of terephthaloyl chloride.

The operating conditions and the result obtained are as follows:

| Copolymer/NMP % | 15.8 |
| --- | --- |
| CaCl$_2$/NMP % | 5.57 |
| C$_m$ | 0.75 |
| Inherent viscosity | 3.64 |

EXAMPLES 39 AND 40

The procedure of Example 30 is followed, but using different amounts and methods of introduction of the two chlorides.

| Examples | 39 | 40 |
| --- | --- | --- |
| Temperature of the diamine solution, in °C. | 10 | 30 |
| Introduction of adipoyl chloride, amount in g | 263.58 | 549.12 |
| Cooling time to 20° C., in minutes | 3 | 9 |
| Introduction of terephthaloyl chloride, amount in g | 925.80 | 609.06 |
| Copolymer/NMP % | 8.10 | 9.50 |
| CaCl$_2$/NMP % | 6.15 | 6.14 |
| C$_m$ | 1.58 | 1.33 |
| Inherent viscosity | 4.65 | 3.8 |

What is claimed is:

1. A process for the discontinuous production of a spinnable polyamide consisting of repeating units of the generic formula:

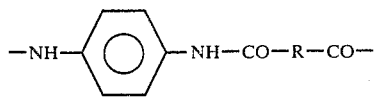

in which 50 to 100% of the radicals R are p-phenylene radicals and the remaining 0 to 50% of the radicals R consist essentially of n-butylene radicals, which polyamide has a fiber-forming viscosity, measured at 25° C. on a solution in 100% strength sulphuric acid which has a concentration of 0.5 g of polymer in 100 ml of solvent, characterized in that terephthaloyl chloride, or terephthaloyl chloride and adipoyl chloride, is reacted with a solution selected from the group consisting of para-phenylenediamine, 4,4'-diaminoadipanilide, and a mixture of the same, in a mixture of N-methylpyrrodlidone-2 and calcium chloride, under conditions such that: the acid chloride or chlorides and the diamine or diamines are in essentially stoichiometric proportions; the solution of diamine or diamines in the mixture of N-methylpyrrolidone-2 and CaCl$_2$ is homogeneous and substantially anhydrous; with the CaCl$_2$ initially being in and remaining in solution at the time of its use; the calcium chloride content is such that the ratio C$_m$ of the number of mols of calcium chloride to the number of units:

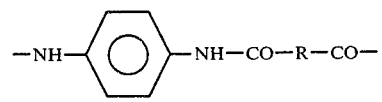

is between 0.70 and 2.90; and the relative amounts of reactants and solvents are chosen such that, at the end of the reaction, the polymer content of the resulting polymer-containing composition obtained is between 5 and 16% by weight, relative to the N-methylpyrrolidone-2.

2. A process according to claim 1, in which the calcium chloride content is between 2 and 8% by weight, relative to the N-methylpyrrolidone-2.

3. A process accordng to claim 1, in which the water content of the solution of diamine in the mixture of N-methylpyrrolidone-2 and CaCl$_2$ is at most 1,500 parts per million.

4. A process according to claim 1, in which the temperature of the solution of diamine in the mixture of N-methylpyrrolidone-2 and CaCl$_2$ is lower than or equal to 50° C.

5. A process according to claim 4, in which the temperature of the diamine solution is between 0° and 30° C.

6. A process according to claim 1 in which the water content of the solution of diamine in the mixture of N-methylpyrrolidone-2 and CaCl$_2$ is at most 500 parts per million.

* * * * *